(12) United States Patent
Shinbo

(10) Patent No.: US 6,736,014 B2
(45) Date of Patent: May 18, 2004

(54) STRAIN SENSOR OF LITTLE RESIDUAL STRAIN AND METHOD FOR FABRICATING IT

(75) Inventor: Kunio Shinbo, Miyagi-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 10/256,741

(22) Filed: Sep. 26, 2002

(65) Prior Publication Data

US 2003/0066355 A1 Apr. 10, 2003

(30) Foreign Application Priority Data

Oct. 4, 2001 (JP) ........................................ 2001-308408

(51) Int. Cl.[7] .................................................. G01B 7/16
(52) U.S. Cl. ............................ 73/777; 73/774; 438/50; 257/414
(58) Field of Search .................... 73/777, 774; 257/414, 257/417; 438/50

(56) References Cited

U.S. PATENT DOCUMENTS 4,786,887 A * 11/1988 Bringmann et al. ........... 338/2
5,001,454 A * 3/1991 Yamadera et al. ........... 338/308
5,622,901 A * 4/1997 Fukada ........................ 438/50
5,631,622 A * 5/1997 Hauber et al. ................. 338/2

FOREIGN PATENT DOCUMENTS

JP 6-58706 3/1994

* cited by examiner

*Primary Examiner*—Edward Lefkowitz
*Assistant Examiner*—Alandra Ellington
(74) *Attorney, Agent, or Firm*—Beyer Weaver & Thomas

(57) ABSTRACT

For the metal substrate of a strain sensor, a Mo-containing two-phase stainless steel SUS329 is used. When an insulating layer, electrodes and a resistor are formed on the metal substrate by baking their materials, the alpha phase in the stainless steel of the metal substrate changes to a sigma phase through the baking heat, and, as a result, the range of strain applicable to the sensor within the elastic region of the substrate is broadened and the residual strain of the substrate is reduced. The strain sensor has a broad strain-detectable range and is readily restored to its starting point.

7 Claims, 3 Drawing Sheets

STRAIN SENSOR OF LITTLE RESIDUAL STRAIN AND METHOD FOR FABRICATING IT

BACKGROUND OF THE INVENTION

1. Field of the Invention

The present invention relates to a multi-layered strain sensor with a resistor fitted therein, in particular to such a strain sensor in which the degree of strain in the elastic region of its metal substrate is increased while the residual strain in that region is reduced to thereby enable accurate strain detection in a broad detectable range.

2. Description of the Related Art

Ordinary strain sensors generally used in the art have a multi-layered structure that comprises an insulating layer of a glass material formed on the surface of a metal substrate, a pair of electrodes formed on the surface of the insulating layer, and a resistor formed between the electrodes.

In the strain sensor of the type, when strain is imparted to the metal substrate in the tensile direction or in the compressive direction, both the metal substrate and the resistor receive the strain and the electric resistance value of the resistor is thereby changed. The resistor is packaged, for example, in a detection circuit such as a Wheatstone bridge circuit, and its electric resistance change is detected. With that, the strain sensor gives a detection output that depends on the degree of strain imparted thereto.

For example, the metal substrate of the strain sensor is generally made of SUS430 (18Cr stainless).

The strain sensor is to detect the electric resistance change of the resistor therein when some strain acceptable in its elastic region is imparted thereto. Accordingly, for broadening the strain-detectable range of the strain sensor, it is desirable that the strain range (up to the yield point) in the elastic region of the metal substrate of the strain sensor is broadened.

However, when the metal substrate is formed of a SUS material, for example, ordinary ferrite-type stainless steel such as SUS430 or austenite-type stainless steel, it has a drawback in that the strain range acceptable in its elastic region is narrow.

One reason of the drawback is as follows: When an insulating film of a glass material is formed on the metal substrate, its material is baked thereon, and, in addition, when electrodes and a resistor of a cermet material or the like are formed thereon, their materials are also baked. The baking is effected at high temperatures of from 800 to 900° C. As a result, the metal substrate formed of stainless steel such as SUS430 becomes brittle through such high-temperature baking treatment and its yield point is thereby lowered.

In addition, when the ferrite stainless steel such as SUS430 is processed at such high temperatures and when the thus-processed stainless steel receives strain in its elastic region, it has residual strain therein. In that condition, when the stainless steel thus having residual strain therein further receives strain and is thereafter restored to its original condition owing to its elasticity, it still keeps the residual strain therein. As a result, when the stainless steel of the type is used in a strain sensor for detecting an electric resistance value, the accuracy of the sensor to be restored to its starting point is low and the sensor will fail to attain accurate detection.

SUMMARY OF THE INVENTION

The present invention is to solve the related-art problems noted above, and its one object is to provide a strain sensor, which is specifically so designed that the strain range of the metal substrate thereof is broadened in its elastic region to thereby ensure a broadened strain-detectable region of the sensor, and to provide a method for fabricating the strain sensor.

Another object of the invention is to provide a strain sensor of which the residual strain remaining in its elastic region is reduced to thereby enable accurate strain detection with it, and to provide a method for fabricating the strain sensor.

The invention provides a strain sensor which comprises a metal substrate, an insulating layer formed on the surface of the metal substrate, a resistor formed on the surface of the insulating layer, and electrodes connected to both ends of the resistor, respectively;

wherein the metal substrate is formed of a stainless steel that contains from 16 to 26% by weight of Cr and from 2 to 6% by weight of Mo.

The stainless steel that contains Cr and Mo has a high tensile strength and its yield point and hardness are also both high, and therefore its strain range in its elastic region is broad.

In the invention, the stainless steel may be of a type of ferrite, but is preferably of a type of two-phase configuration that contains from 3 to 8% by weight of Ni. Specifically, it is preferable that the metal substrate is formed of such a two-phase stainless steel that contains from 16 to 26% by weight of Cr, from 3 to 8% by weight of Ni and from 2 to 6% by weight of Mo. The two-phase stainless steel of the type has a high tensile strength and a high yield point, and therefore has a broad strain range in its elastic region. Accordingly, it broadens the strain-detectable range of the strain sensor comprising it.

Also preferably, the metal configuration of the stainless steel contains a sigma phase, or contains both a gamma phase and a sigma phase. The insulating layer is made of, for example, a glass material.

The method for producing the strain sensor of the invention comprises:

(a) a step of forming a layer of a pasty glass material on the surface of a metal substrate of a stainless steel that contains from 16 to 26% by weight of Cr and from 2 to 6% by weight of Mo, (b) a step of baking the pasty glass material to form an insulating layer, (c) a step of forming electrodes and a resistor on the insulating layer through baking their materials;

wherein the baking temperature is not lower than 800° C. in at least any one baking step of (b) and (c).

Preferably in the method, the metal substrate is formed of a stainless steel that contains from 16 to 26% by weight of Cr, from 3 to 8% by weight of Ni and from 2 to 6% by weight of Mo.

In the invention, the stainless steel containing Mo is use. Therefore, when it is baked at a temperature not lower than 800° C., its alpha phase changes into a sigma phase and therefore both its hardness and yield point increase. As compared with Mo-free stainless steel heated at such a temperature, the Mo-containing stainless steel for use in the invention can broaden its strain range in its elastic region and can reduce its residual strain in its elastic region.

DESCRIPTION OF THE PREFERRED EMBODIMENTS

The invention is described in detail hereinunder with reference to its preferred embodiments.

Figure 1:
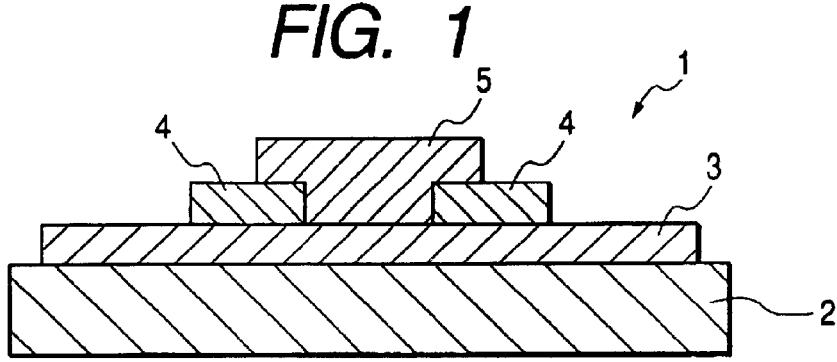
FIG. 1 is a cross-sectional view showing the structure of a strain sensor, in which reference numeral 1 is a strain sensor, 2 is a metal substrate, 3 is an insulating layer, 4 is an electrode and 5 is a resistor.

FIG. 1 is a cross-sectional view showing the structure of a strain sensor.

As in FIG. 1, a strain sensor 1 has an insulating layer 3 formed on its metal substrate 2. On both sides of the surface of the insulating layer 3, formed are a pair of electrodes 4, 4; and a resistor 5 is provided on the insulating layer 3 between the electrode 4 and the electrode 4.

For producing the strain sensor 1, glass paste is screen-printed on the surface of the metal substrate 2, and this is baked to form the insulating layer 3 of glass thereon. Next, on the surface of the insulating layer 3, a pasty silver material is printed and then baked to form the electrodes 4, 4. Further, a pasty cermet material, which is formed of metal powder of ruthenium oxide or the like and glass powder, is screen-printed on the layer 3 between the electrode 4 and the electrode 4, and then baked to form the resistor 5 therebetween.

In the process of producing the strain sensor 1 as in the above, the materials are baked in multiple stages, and the baking temperature in all steps shall fall between 800 and 900° C. Preferably, the baking temperature in forming every layer is not lower than 850° C.

In one embodiment of the invention, the metal substrate 2 is formed of a two-phase stainless steel that contains from 16 to 26% by weight of Cr, from 3 to 8% by weight of Ni and from 2 to 6% by weight of Mo. Before baked, the two-phase stainless steel has an alpha phase to form ferrite and has a gamma phase to form austenite.

One example of the two-phase stainless steel that falls within the composition range as above is SUS329J4L (hereinafter referred to as SUS329) standardized in JIS (see Table 1). SUS329 contains from 24 to 26% by weight of Cr, from 5.5 to 7.5% by weight of Ni and from 2.5 to 3.5% by weight of Mo.

As in Table 1, since SUS329 contains Mo, both its hardness and yield point are high and its strength against tensile deformation is also high. Therefore, when the metal substrate 2 of the strain sensor 1 is formed of SUS329, its strain range in its elastic region is broadened. In addition, when it receives strain in its elastic region, its residual strain is small.

Further, when the Mo-containing stainless steel is baked several times at a temperature not lower than 800° C. in the process of fabricating the strain sensor 1 with it, both its yield point and hardness increase more. After baked in that condition, therefore, the strain range of the thus-baked stainless steel in its elastic region is further broadened and the strain range detectable with the strain sensor 1 with it is thereby further broadened. Moreover, the residual strain in the stainless steel having received strain in its elastic region is reduced.

The reason why the yield point, the hardness and the strength of such Mo-containing stainless steel increase after baked is because the alpha phase to form the Mo-containing ferrite structure of the stainless steel changes to a sigma phase through the heat treatment at 800° C. or higher and, as a result, the yield point, the hardness and the strength of the thus-heated stainless steel increase. In general, a steel with an increased sigma phase is brittle. However, so far as the strain sensor 1 is used in such a condition that it receives strain within the range of the elastic region of the stainless steel therein, the brittleness of the stainless steel therein causes no problem.

Figure 2:
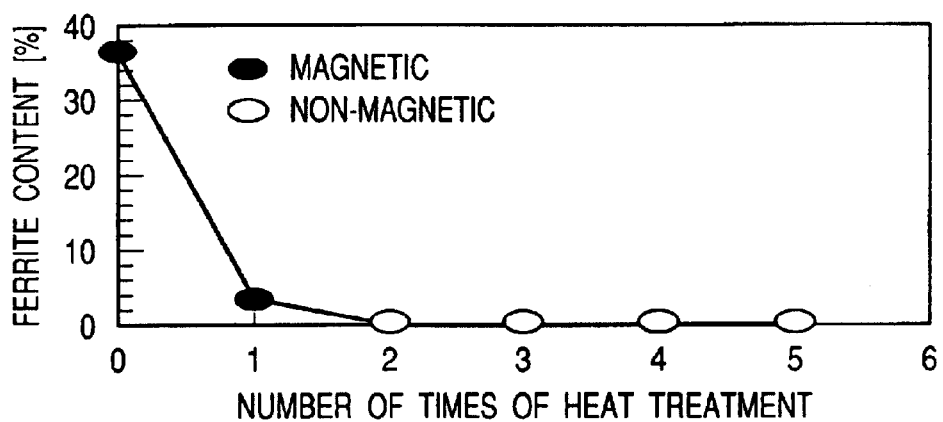
FIG. 2 is a graph showing the relationship between the number of times of heat-treatment of SUS329 to be a metal substrate and the ferrite content of the thus heat-treated stainless steel.
Figure 3:
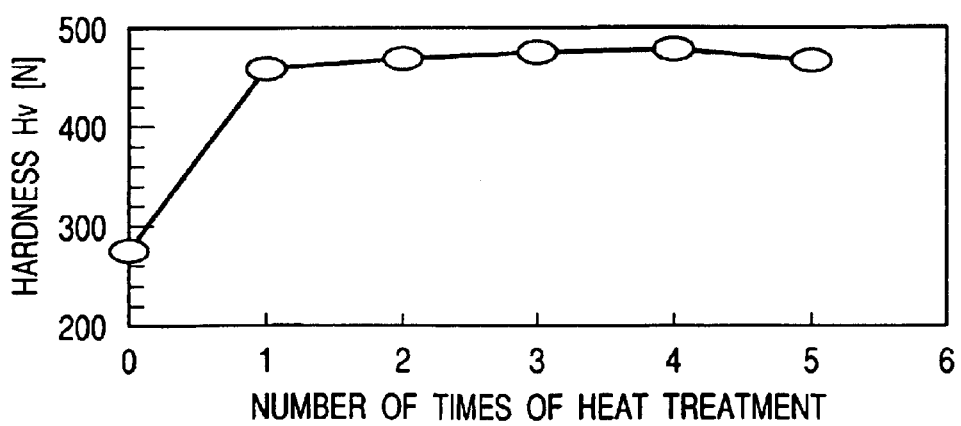
FIG. 3 is a graph showing the relationship between the number of times of heat-treatment of SUS329 to be a metal substrate and the hardness of the thus heat-treated stainless steel.

FIG. 2 shows the relationship between the number of times of heat-treatment at 850° C. of SUS329 and the ferrite content in terms of % by weight of the thus heat-treated stainless steel; and FIG. 3 shows the relationship between the number of times of that heat-treatment of the stainless steel and the hardness, Hv thereof.

As in FIG. 2, it is understood that the alpha phase in the stainless steel almost completely changes to a sigma phase therein after heated once at 850° C., and after heated twice or more, the stainless steel almost completely loses its alpha phase. From FIG. 3, it is understood that the hardness of the stainless steel increases after heated once or more.

Figure 4:
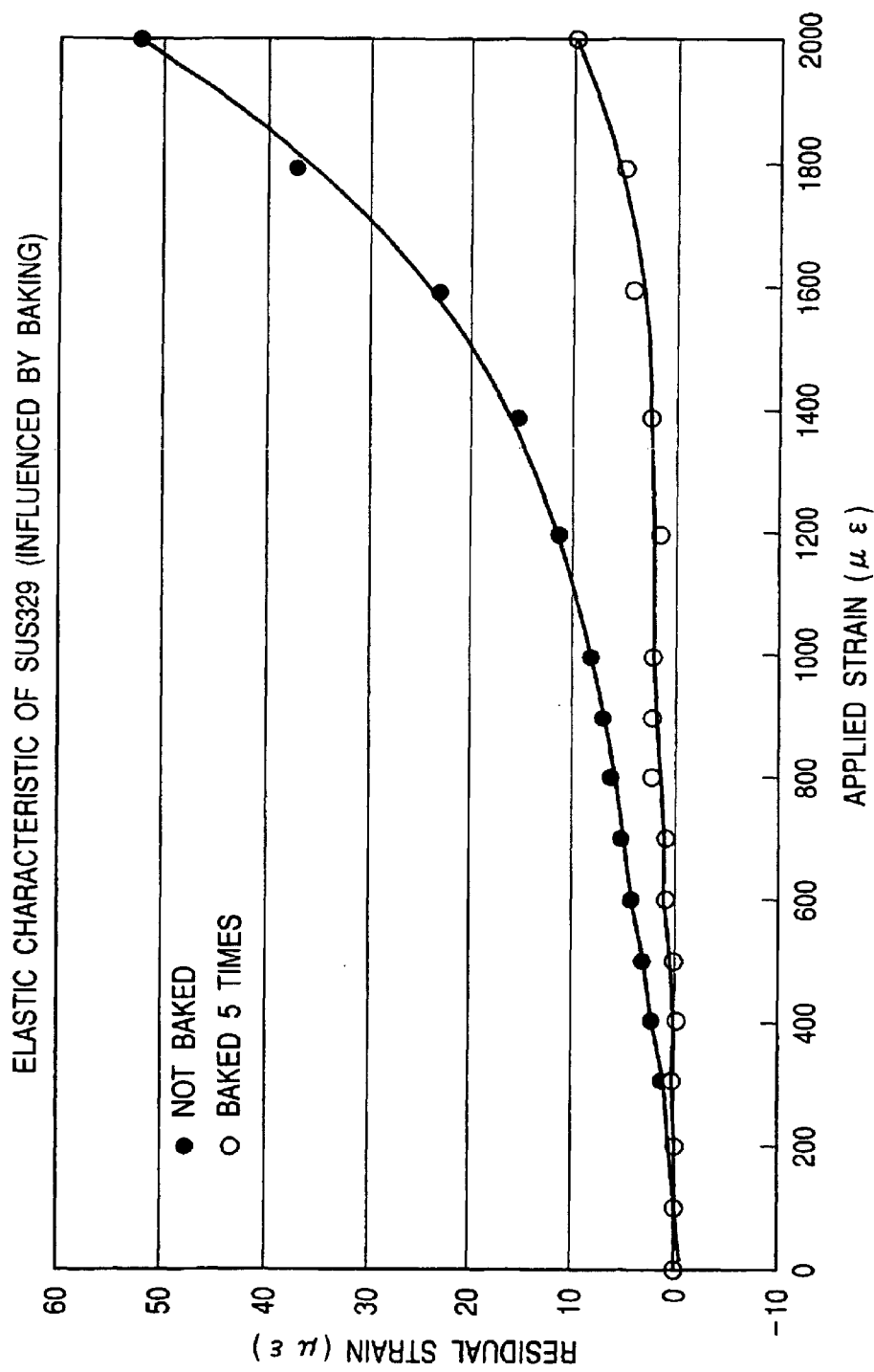
FIG. 4 is a graph showing the relationship between the tensile strain applied to SUS329 to be a metal substrate and the residual strain of the stainless steel before and after heat treatment.

FIG. 4 is a graph showing the residual strain characteristic of SUS329 deformed under tension, in which the horizontal axis indicates the degree of strain applied to the steel and the vertical axis indicates the residual strain in the steel. The curve drawn to connect the black dots indicates the data of non-heated SUS329; and that drawn to connect the white dots indicates the data of SUS329 heated five times at 850° C. In this description, the degree of strain is expressed in terms of $\mu\epsilon$ (microstrain). $\mu\epsilon$ is (degree of strain×10$^6$).

Figure 5:
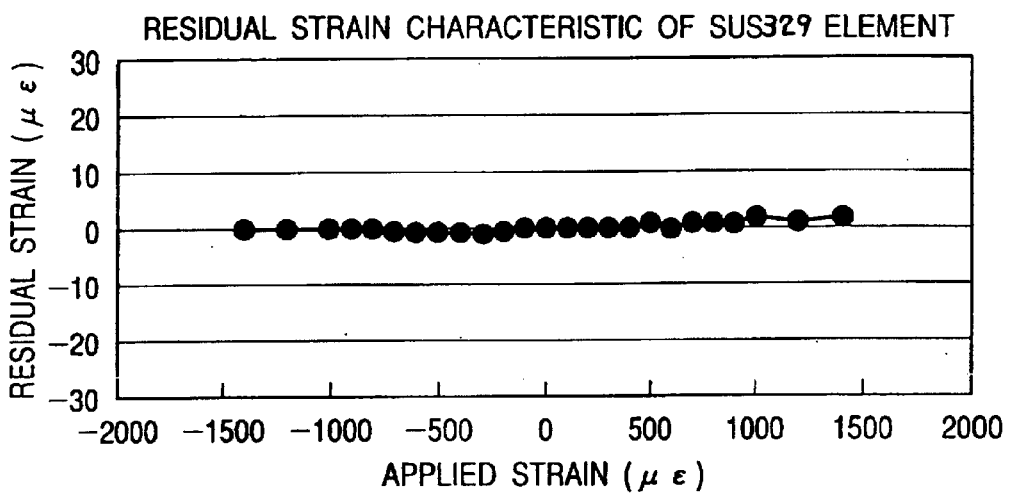
FIG. 5 is a graph showing the relationship between the tensile and compressive strain applied to heat-treated SUS329 to be a metal substrate, and the residual strain thereof.

From FIG. 4, it is understood that the alpha phase in the heat-treated SUS329 changes to a sigma phase therein and, as a result, the residual strain in the heated stainless steel greatly reduces. FIG. 5 is described. Stepwise varying tensile strain is imparted to SUS329 having been heated five times at 850° C., and the residual strain in the stainless steel is plotted relative to the strain applied thereto; and thereafter stepwise varying compressive strain is imparted thereto, and the residual strain therein is plotted relative to the strain applied thereto. The resulting data are in FIG. 5. From FIG. 5, it is understood that, when both tensile strain and compressive strain are imparted to the heat-treated SUS329, residual strain in the stainless steel is low. This confirms that the residual strain in the strain sensor 1 that comprises the heat-treated stainless steel is small in any service condition for detecting both tensile strain and compressive strain, and the accuracy of the strain sensor 1 to be restored to its starting point of detection value is high.

From FIG. 4 and FIG. 5, it is also understood that the elastic region of the strain sensor 1 covers the range of 1400

με in terms of the absolute value of the degree of tensile and compressive strain applicable thereto. This confirms that the strain range of the sensor is broad in its elastic region.

As in FIG. 4 and FIG. 5, when the strain sensor 1 receives tensile strain and compressive strain of ±1400 με each, its residual strain is from 2 to 3 με or so. Accordingly, the accuracy of the strain sensor for restoration to its starting point, or that is, the ratio, FS, of the maximum applied strain (1400) to the residual strain (2 to 3) falls between 0.14 and 0.21%. In general, it is said that the FS value of the strain sensor 1 is difficult to lower to at most 0.5%. According to one embodiment of the invention, however, the FS value of the strain sensor 1 may be lower than 0.5%.

In another embodiment of the invention, the metal substrate 2 of the strain sensor 1 is formed of a ferrite-type stainless steel that contains from 16 to 26% by weight of Cr and from 2 to 6% by weight of Mo. One example of the ferrite-type stainless steel is SUS444 shown in Table 1 below. SUS444 contains from 17 to 20% by weight of Cr and from 1.75 to 2.5% by weight of Mo. Not containing Ni, almost all of it is an alpha phase before heated.

Figure 6:
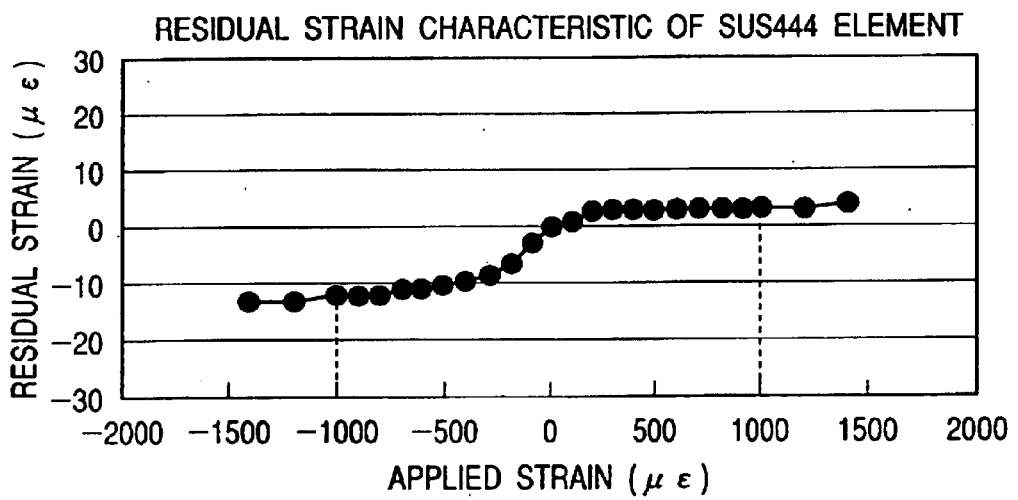
FIG. 6 is a graph showing the relationship between the tensile and compressive strain applied to heat-treated SUS444 to be a metal substrate, and the residual strain thereof.

FIG. 6 is described. Stepwise varying tensile strain is imparted to SUS444 having been heated five times at 850° C., and the residual strain in the stainless steel is plotted relative to the strain applied thereto; and thereafter stepwise varying compressive strain is imparted thereto, and the residual strain therein is plotted relative to the strain applied thereto. The resulting data are in FIG. 6.

When SUS 444 is heat-treated at 850° C., almost all the alpha phase in the stainless steel changes to a sigma phase, and, as a result, the strain range in its elastic region broadens and the residual strain of the stainless steel reduces.

From the graph of FIG. 5, it is understood that the elastic region of the stainless steel covers up to around 1000 με at least in the tensile direction (+). It is also understood from it that the residual strain of the stainless steel having received tensile strain within a range of up to 1000 με is smaller than 5 με, and the FS value of the stainless steel, (less than 5/1000)=less than 0.5%.

From FIG. 6, however, it is understood that, when the stainless steel receives tensile strain and then compressive strain, it undergoes nearly plastic deformation before it reaches −1000 με and its residual strain is larger than −10 με. On the other hand, when compressive strain is first imparted to the heat-treated SUS444 and then tensile strain is thereto, the residual strain characteristic pattern of the stainless steel is an upside-down pattern of FIG. 6.

Regarding the service condition of the strain sensor 1 in which the metal substrate 2 is formed of SUS444, the strain-detectable range of the strain sensor 1 can be broadened when it is used in the condition in which it receives tensile strain only or in the condition in which it receives compressive strain only. In that condition, the strain-detectable range of the sensor 1 can be broadened and the residual strain thereof is reduced, and therefore the accuracy of the strain sensor 1 to be restored to its starting point is high.

TABLE 1

| Class | | Ferrite | Two-phase Configuration |
|---|---|---|---|
| Type | | SUS444 | SUS329J4L |
| Essential Composition | | 19Cr—2Mo—Ti, Nb, Zr | 25Cr—6Ni—3Mo—N |
| Other Ingredients than Fe (% by weight) | C | ≦0.015 | ≦0.030 |
| | Si | ≦1.00 | ≦1.00 |
| | Mn | ≦1.00 | ≦1.50 |
| | P | ≦0.040 | ≦0.040 |
| | S | ≦0.030 | ≦0.030 |
| | Ni | — | 5.5 to 7.5 |
| | Cr | 17 to 20 | 24 to 26 |
| | Mo | 1.75 to 2.50 | 2.50 to 3.50 |
| | N | ≦0.025 | 0.08 to 0.30 |
| Hardness Hv [N] | | ≦230 × 9.8 | ≦320 × 9.8 |

According to the invention described hereinabove with reference to its preferred embodiments, obtained is a strain sensor that ensures a broad strain-detectable range and ensures accurate strain detection, and it has little residual strain to detract from restoration to its starting point.

What is claimed is:

1. A strain sensor which comprises a metal substrate, an insulating layer formed on the surface of the metal substrate, a resistor formed on the surface of the insulating layer, and electrodes connected to both ends of the resistor, respectively;

wherein the metal substrate is formed of a stainless steel of two-phase configuration type that contains from 16 to 26% by weight of Cr, from 3 to 8% by weight of Ni and from 2 to 6% by weight of Mo.

2. The strain sensor as claimed in claim 1, wherein the stainless steel is of a type of ferrite.

3. The strain sensor as claimed in claim 1, wherein the insulating layer is formed of a glass material.

4. The strain sensor as claimed in claim 1, wherein the metal configuration of the stainless steel contains a sigma phase.

5. The strain sensor as claimed in claim 4, wherein the metal configuration of the stainless steel contains a gamma phase and a sigma phase.

6. A method for producing a strain sensor, which comprises:

(a) a step of forming a layer of a pasty glass material on the surface of a metal substrate of a stainless steel that contains from 16 to 26% by weight of Cr and from 2 to 6% by weight of Mo, (b) a step of baking the pasty glass material to form an insulating layer, (c) a step of forming electrodes and a resistor on the insulating layer through baking their materials;

wherein the baking temperature is not lower than 800° C. in at least any one baking step of (b) and (c).

7. The method for producing a strain sensor as claimed in claim 6, wherein the metal substrate is formed of a stainless steel that contains from 16 to 26% by weight of Cr, from 3 to 8% by weight of Ni and from 2 to 6% by weight of Mo.

* * * * *